United States Patent
Aarts

(10) Patent No.: US 8,640,430 B2
(45) Date of Patent: Feb. 4, 2014

(54) METHOD AND ASSEMBLY FOR THE CONTROLLED CHANGE OF THE GAS CONTENT INSIDE A PACKAGE

(75) Inventor: Mathias Leonardus Cornelis Aarts, Bilthoven (NL)

(73) Assignee: Interprise-Brussels S.A. (BE)

( * ) Notice: Subject to any disclaimer, the term of this patent is extended or adjusted under 35 U.S.C. 154(b) by 289 days.

(21) Appl. No.: 12/310,428

(22) PCT Filed: Apr. 20, 2007

(86) PCT No.: PCT/EP2007/053890

§ 371 (c)(1),
(2), (4) Date: Feb. 24, 2009

(87) PCT Pub. No.: WO2008/022815

PCT Pub. Date: Feb. 28, 2008

(65) Prior Publication Data

US 2009/0313954 A1    Dec. 24, 2009

(51) Int. Cl.
*B65B 31/04* (2006.01)
(52) U.S. Cl.
USPC ............. 53/79; 53/111 R; 53/408; 53/428; 53/432; 53/512
(58) Field of Classification Search
USPC ........... 53/79, 84, 111 R, 408, 428, 432, 434, 53/510, 512
See application file for complete search history.

(56) References Cited

U.S. PATENT DOCUMENTS

| | | | |
|---|---|---|---|
| 2,506,056 A * | 5/1950 | Bergstein | 229/122.33 |
| 2,506,769 A * | 5/1950 | Bergstein | 53/432 |
| 2,708,541 A | 5/1955 | Jones | |
| 3,026,656 A | 3/1962 | Rumsey, Jr. | |
| 3,216,172 A | 11/1965 | Piazze | |
| 4,055,931 A * | 11/1977 | Myers | 53/408 |
| 4,058,953 A * | 11/1977 | Sanborn et al. | 53/433 |
| 4,420,015 A * | 12/1983 | Blaser | 137/852 |
| 4,537,011 A * | 8/1985 | Bortolani et al. | 53/509 |
| 5,228,269 A * | 7/1993 | Sanfilippo et al. | 53/432 |
| 5,252,408 A * | 10/1993 | Bridges et al. | 428/621 |
| 5,263,777 A * | 11/1993 | Domke | 383/103 |
| 5,900,299 A * | 5/1999 | Wynne | 428/69 |
| 6,106,449 A * | 8/2000 | Wynne | 493/101 |
| 2002/0174627 A1 * | 11/2002 | Kitamura et al. | 53/400 |

FOREIGN PATENT DOCUMENTS

| | | |
|---|---|---|
| EP | 0626312 A2 | 2/1994 |
| NL | 7204021 | 9/1973 |

* cited by examiner

*Primary Examiner* — Alexandra Elve
*Assistant Examiner* — Eyamindae Jallow
(74) *Attorney, Agent, or Firm* — Jansson Munger McKinley & Shape Ltd.

(57) ABSTRACT

Method and assembly for evacuating a package (2), such as a vacuum package filled with a product such as nuts. The package is at least partially made of packaging film (6). The method employs a suction device (4) provided with a suction opening, for evacuating the package through an aperture (12) in the packaging film. The package is provided with a substantially plate-shaped, rigid element (8), one main surface of which substantially lying in contact "with the inner side of the packaging film, wherein the aperture in the packaging film is provided at the location of the substantially rigid element. The method further includes the sealing abutment of the suction opening against an outer side of the package, at a location where the substantially rigid element lies in contact with the inner side of the packaging film, in such a way that the aperture is in fluid connection with the suction opening.

11 Claims, 6 Drawing Sheets

METHOD AND ASSEMBLY FOR THE CONTROLLED CHANGE OF THE GAS CONTENT INSIDE A PACKAGE

FIELD OF THE INVENTION

The invention relates to a method for the controlled change of the gas content inside a package and comprising at least an evacuation step of a gas contained in said package (such as a vacuum package filled with a product such as nuts), wherein the package is at least partially made of packaging film and wherein use is made of a suction device provided with a suction opening, for evacuating the package through an aperture in the packaging film.

The invention further relates to an assembly of a package and a rigid element for performing such a method, a kit of parts comprising a suction device and a rigid element, a substantially rigid element of the kit of parts and use thereof.

BACKGROUND OF THE INVENTION

A method for evacuating a package is known from EP0626312. In the known method an airtight package is pierced using a needle and vacuum is drawn through the aperture thus created. To this end a suction device is connected airtightly to a cover of a chamber in which the package is compressed prior to being evacuated.

Said method, however, has drawbacks. For evacuating the package, a chamber is required for accommodating and compressing the package. For larger packages, having a volume of for example 1000 litres, a large chamber is therefore required, which is impractical and requires expensive equipment (chambers).

U.S. Pat. No. 3,026,656 proposes to apply to the interior of a packaging film a label or reinforcing board such as cellophane or paper coated with a thermoplastic material, and comprising an aperture. The section of packaging film comprised within the perimeter of said label or reinforcing board comprises an aperture offset with respect to the label's aperture. A vacuum chamber is applied against the exterior of the packaging film at the location of the label, and air is withdrawn from the interior of the package by actuating a vacuum pump. The evacuation aperture in the packaging film can be sealed after evacuation by pressing a heated tool against the packaging film and label. The problem with this solution is that the label or reinforcing board are relatively flexible materials which cannot ensure a smooth enough contact surface for an air tight contact to be obtained with the vacuum chamber in case a relatively coarse granular product is contained in the package.

U.S. Pat. No. 3,026,656 proposes to apply to the interior of a packaging film a label or reinforcing board such as cellophane or paper coated with a thermoplastic material, and comprising an aperture. The section of packaging film comprised within the perimeter of said label or reinforcing board comprises an aperture offset with respect to the label's aperture. A vacuum chamber is applied against the exterior of the packaging film at the location of the label, and air is withdrawn from the interior of the package by actuating a vacuum pump. The evacuation aperture in the packaging film can be sealed after evacuation by pressing a heated tool against the packaging film and label. The problem with this solution is that the label or reinforcing board are relatively flexible materials which cannot ensure a smooth enough contact surface for an air tight contact to be obtained with the vacuum chamber in case a relatively coarse granular product is contained in the package. U.S. Pat. No. 3,216,172 proposes to solve the above problem by replacing the label or reinforcing board described above by a relatively stiff patch. The air in the package is evacuated through perforations in the patch, thus reaching an aperture in the packaging film. The perforation in the patch must be sufficiently fine to not allow the passage of the particles of the granulated or powdered bag content. The manufacturing of such patches can become problematic in case of applications with fine powders, and lead to unacceptably high pressure losses during evacuation of the package. Furthermore, this type of patches is prompt to clogging with granular or powdered materials: on the one hand, the finer the aperture (s) in the patch, the higher the risk of clogging by fine powders and, on the other hand, larger granules or particles can easily obstruct an aperture thus reducing the efficacy of evacuation or even stop stopping it altogether.

Furthermore, the existing systems allow a package to be evacuated once, which is thereafter irreversibly sealed by a hot sealing-device. It is, however, sometimes desirable to have a reversibly sealed package to allow multi-stages evacuation processes, and it can be necessary in certain cases to inject a gas into said package.

There therefore remains a need in the art for allowing rapid variation of the gas content and composition in a package, regardless of the size thereof, applicable to a broad selection of products to be packed, and requiring little investments and equipment of small size.

SUMMARY OF THE INVENTION

The present invention is defined in the appended independent claims. Preferred embodiments are defined in the dependent claims. In particular, the present invention concerns a method for the controlled change of the gas content inside a package suitable for holding a vacuum and filled with a product, wherein said package is at least partially made of a packaging film, said method comprising at least an evacuation step comprising the following steps:
  (a) providing at least one aperture in said packaging film;
  (b) providing a substantially rigid element comprising a first and second main surfaces separated by the element's thickness and comprising at least one opening fluidly connecting said first main surface to said second main surface;
  (c) positioning said rigid element in the interior of the package, such that the first main surface of the rigid element substantially contacts the inner surface of the packaging film and such that the at least one aperture of the film is enclosed within the rigid element's perimeter;
  (d) providing a suction device connected to means for drawing vacuum, like a vacuum pump, and comprising a suction opening which perimeter fits into the perimeter of the rigid element;
  (e) sealingly abutting the suction device to the outer surface of the packaging film such that the perimeter of the suction device's opening rests entirely on the rigid element separated therefrom by the thickness of the packaging film;
  (f) evacuating the fluid to be evacuated from the package through said aperture by actuating the vacuum pump,
wherein the substantially rigid element is designed such as to be permeable to the fluid to be evacuated and substantially impermeable to the product contained in the package and is resistant to clogging by particulate material.

It also concerns an assembly comprising a package at least partially made of a packaging film and a substantially rigid element positioned in the inner side of the packaging film. A kit of parts comprising a suction device and a substantially rigid element as defined above is also addressed, as well as a substantially rigid element particularly suitable for the method described above. The use of a substantially rigid element for evacuating a package is explained. Finally, a suction device suitable for drawing vacuum out of a package and to inject therein an gas, such as an inert gas or a functional gas, is proposed, wherein said device comprises a chamber with an opening which perimeter is suitable for fitting into the perimeter of a rigid element as defined above; wherein said chamber is connected to a vacuum pump, characterized in that, it further comprises a duct connected to a source of gas and slidingly mounted on the chamber's deck such that it can be pushed down through a hole in the packaging film to fit into a stump on the rigid element's first surface when (inert or functional) gas is to be injected into the package, and it can be retrieved from the hole in the packaging film when the package is to be evacuated. The gas to be injected may be any gas as for example, but not limited to, an inert gas or a functional gas having properties such as deodorising, perfuming, sterilizing, reactive, passivating, and the like.

According to the method of the present invention the package is provided with a substantially rigid element, which substantially lies against the inner surface of the packaging film, preferably fixed thereto by e.g., welding or gluing, wherein the aperture in the packaging film is provided at a location comprised within the perimeter of the substantially rigid element, wherein the method furthermore includes: sealingly abutting the opening of a suction device against the outer surface of the package, at a location where the substantially rigid element substantially lies in contact with the inner surface of the packaging film, so that the aperture in the film is in fluid communication with the suction opening. In this way the suction opening sealingly abuts against the outer surface of the package, and there is no need to place the entire package in a chamber. The substantially rigid element can hereby help to locate the aperture. Moreover, the substantially rigid element enables the suction opening to be sealed against the package in a simple manner, regardless of the nature of the product contained inside the package. The surface of the package against which the suction opening abuts will not deform substantially, whilst the film, at the location where the product directly abuts against the film, can be greatly deformed during evacuation, for example due to the film being pressed against the product. A factor that may determine the deformation of the film is the size, consistency, and type of the product contained in the package. A coarse-grained product, such as nuts, can deform the film to such an extent that sealingly abutting the suction opening against the film without the substantially rigid element is virtually impossible.

In the location where it lies against the inner side of the packaging film, the substantially rigid element can form a first contact surface, for example extending in a flat plane, against which the inner side of the packaging film abuts, in such a way that an outer side of the packaging film forms, at the location of the first contact surface, a second contact surface separated from the first contact surface by the thickness of the film, for sealingly abutting the suction opening thereon. Hence, the substantially rigid element ensures that the packaging film forms the second contact surface around the aperture.

The fluid to be evacuated can be any fluid contained in the package, such as oil, moisture, air, or other gases. The most obvious applications of the present invention concern the evacuation of air from a package. Whenever air is mentioned hereinbelow, it should be understood that the teaching can be applied interchangeably to any other fluid to be evacuated.

Preferably, the substantially rigid element comprises a substantially rigid support member comprising at least one aperture, and a filter (40) laminated on the second main surface of said support member, facing away from the packaging film, said filter being permeable to the fluid and substantially impermeable to the product contained in the package. Hence, it is possible to evacuate the package thereby in a simple manner ensuring that the product inside the package does not leak from the package and/or clog the aperture during evacuation. It is thus also possible to evacuate a package containing (very fine) powder, such as, for example, cocoa powder, wherein the powder does not leak from the package and/or clog the aperture. This solution allows a standard base element to be used, comprising at least one aperture of sufficient size and permeability to allow air to be evacuated from the package at a high rate, independently of the content of the package, and to select the filter as a function of the size and properties of the product contained in the package. This highly versatile solution is more economical and yields much lower pressure losses than a rigid element of the prior art comprising minute apertures, which size must be adapted to the product contained in the package.

Preferably, the second surface of the substantially rigid element, facing away from the packaging film, is provided with at least one groove in fluid communication with the at least one opening of the element. The groove substantially prevents the fluid connection between the first and second main surfaces of the substantially rigid element from being sealed off by the product. If the package contains a coarse-grained product, the coarse grains will abut against upright walls of at least one groove, but are unable to completely seal off said groove, so that the fluid connection remains open. If the package contains a fine-grained product, this product will substantially form a porous mass, which will not seal off the fluid connection.

Most preferably, a filter which is permeable to the fluid and substantially impermeable to the product is fixed to said second surface of the substantially rigid element, which is provided with at least one groove in fluid communication with the at least one opening of the element. This laminated geometry is particularly advantageous in that it optimizes the air flow through the rigid element while preventing the passage of the finest powder particles. This effect is enhanced if a network of grooves covering the entire area of said second surface is in fluid communication with the at least one opening. Any structured surface forming a fluid communication network connected to the at least one opening can be envisaged.

Preferably, the substantially rigid element, is provided with a surface structure on the side lying against the packaging film. Hence, an open space can be formed between the film and the substantially rigid element through which the fluid can flow from the package to the suction device during evacuation.

Normally, the substantially rigid element is arranged completely in the interior of the package. This has the advantage that the packaging film, except for the aperture, can extend substantially uninterruptedly along the substantially rigid element, which, for instance, reduces the risk of leakage and/or increases the chance of successful evacuation. It is not excluded, however, that the rigid element extends to the outside of the package, but this embodiment is less preferred. The aperture in the packaging film can be provided after the package is closed fluid-tightly. The packaging film can be pierced at the location of the substantially rigid element to provide the aperture for subsequent evacuation of the package.

According to an embodiment, the method further comprises sealing the aperture after evacuation of the package, for example using an adhesive and/or grease and/or by joining the packaging film to the substantially rigid element, for example by sealing, welding and/or gluing. In this way a sealed evacuated package is obtained.

The substantially rigid element is permeable to a fluid, such as air or oil, and substantially impermeable to the product. Hence, it is possible to suck the fluid from the package through the aperture and through the substantially rigid element. To this end the substantially rigid element is for example provided with at least one perforation that extends from a side of the substantially rigid element abutting against the packaging film to a location on the substantially rigid element that is free from contact with the packaging film. In this way a channel is created through which the fluid can be sucked out of a space enclosed by the package.

Preferably the at least one perforation is offset with respect to the aperture in the packaging film. This offers the advantage that when the package is brought to under pressure, the ambient air pressure can press the aperture closed against the substantially rigid element, thereby allowing the package to be sealed automatically.

Preferably, the suction device, on an outer side thereof, is provided with a circumferential endless sealing edge, which in use, abuts against the outer side of the package at the location where the substantially rigid element substantially abuts against the inner side of the packaging film. In this way, the seal between the packaging film and the suction device can be achieved in a simple manner.

Preferably, the substantially rigid element is designed as a plate-shaped body, such as, for example but not limited to, a disc, ellipse, polygon with or without rounded corners, or any customized shape specially adapted to the geometry of the package. A round disc is a particularly preferred geometry.

By using an adapted suction device, an (inert or functional) gas can be injected into the package before or after evacuation of a fluid such as air.

The invention will now be explained in greater detail by means of the drawing and the detailed description.

DETAILED DESCRIPTION OF THE INVENTION

Figure 1A:
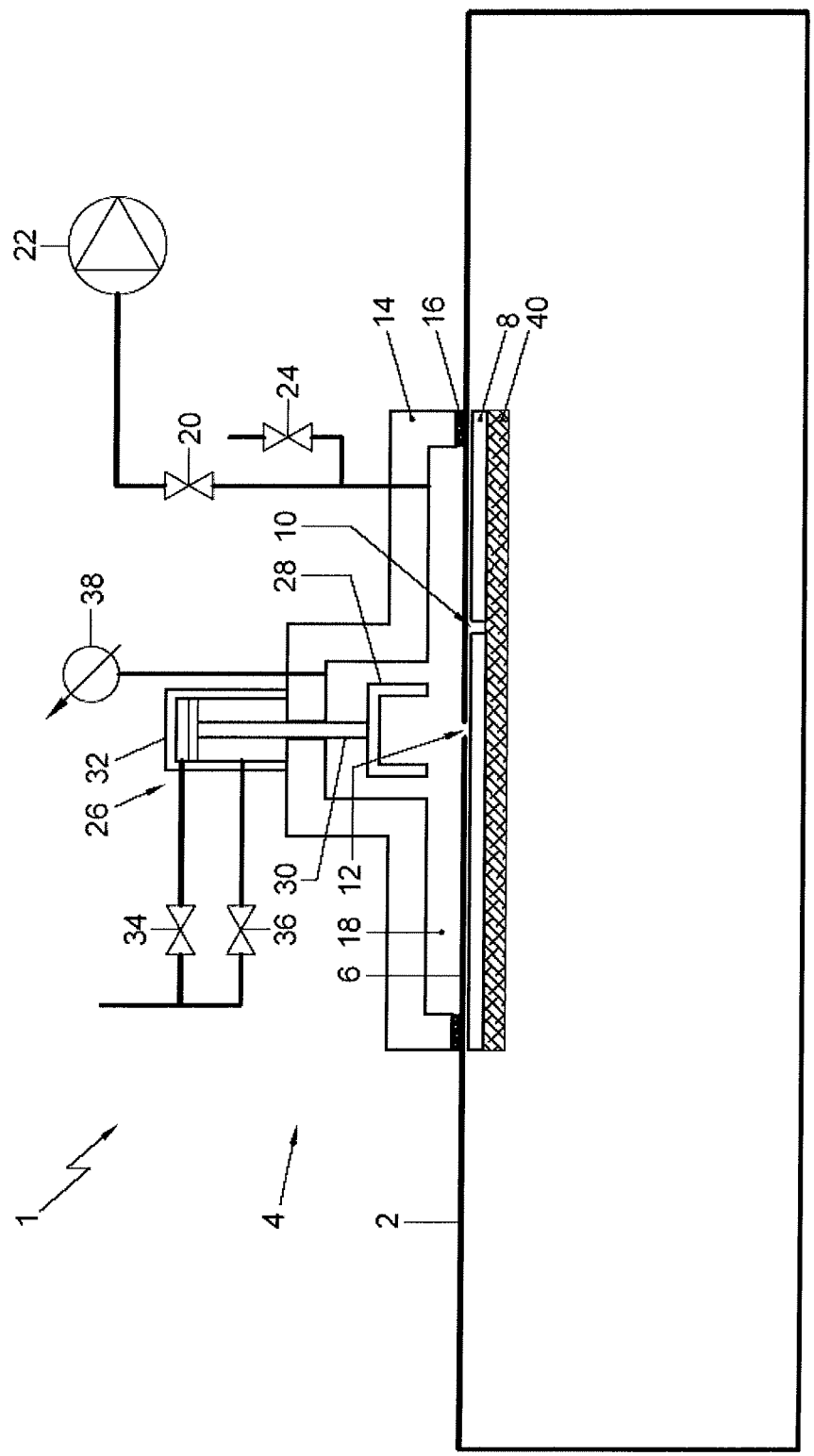
FIG. 1a shows a schematic representation of a first embodiment of an assembly of a package and suction device for evacuation of the package in an inoperative mode.
Figure 1B:
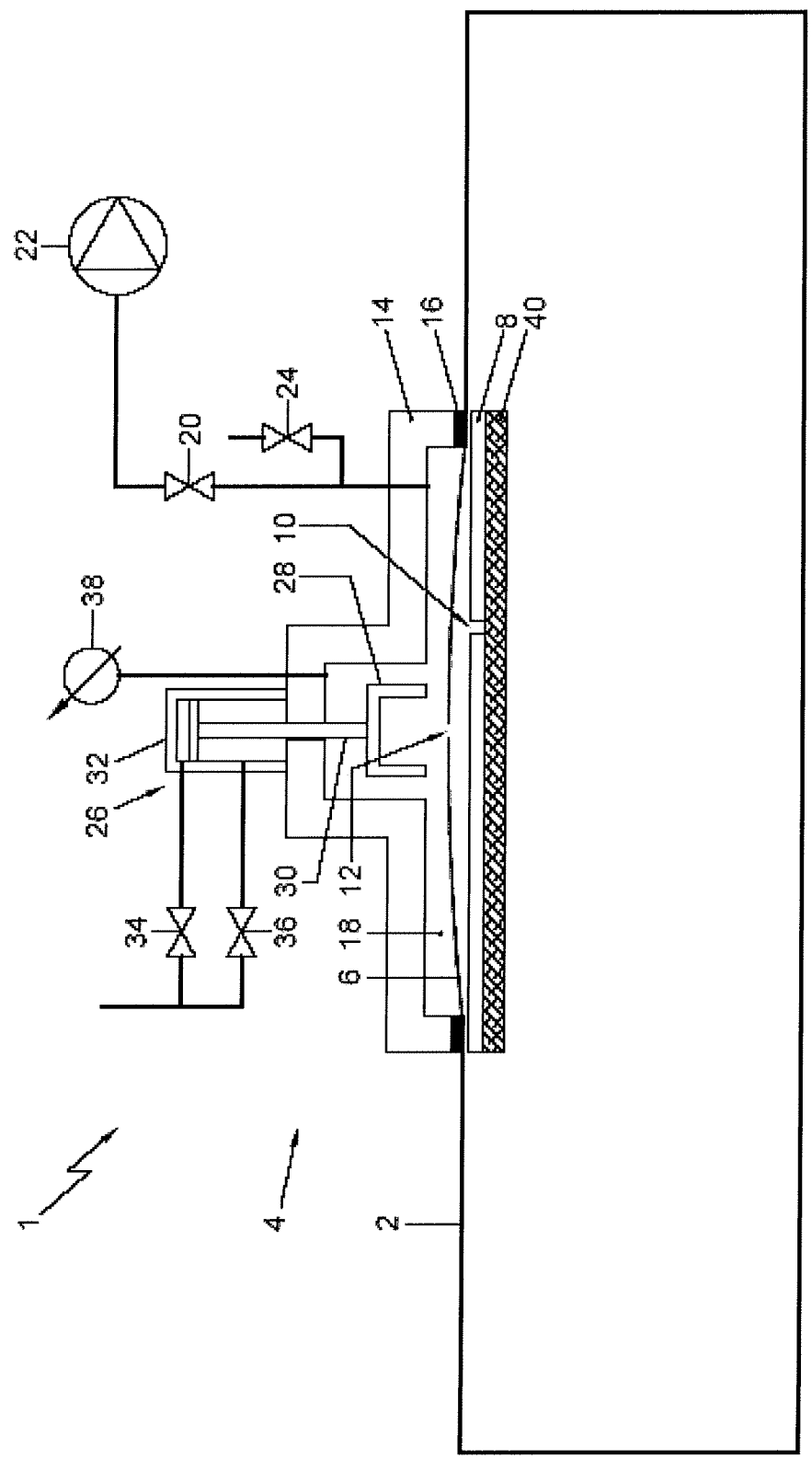
FIG. 1b shows a schematic representation of the assembly of FIG. 1a in first operational mode
Figure 1C:
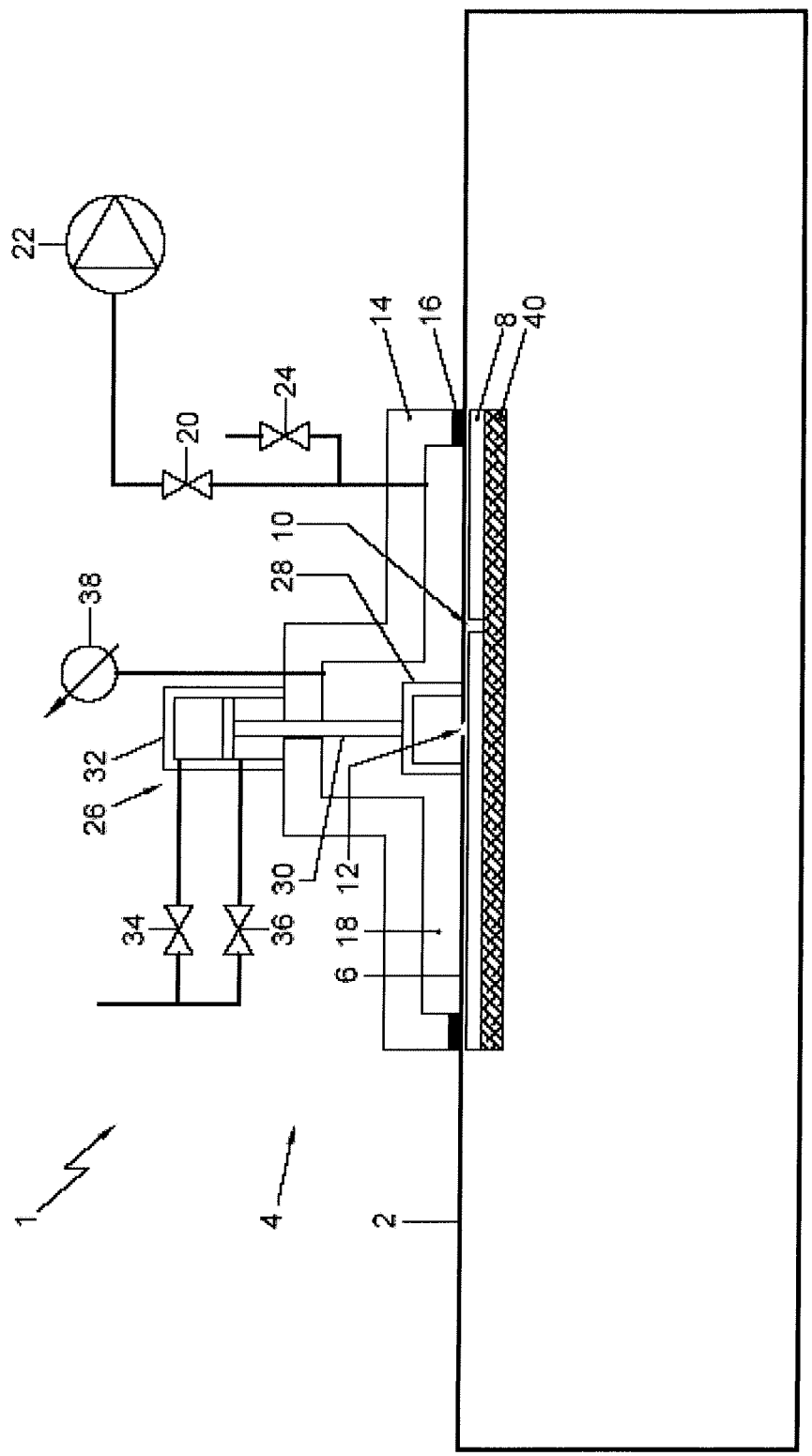
FIG. 1c shows a schematic representation of the assembly of FIG. 1a in second operational mode.

FIGS. 1a-1c show a schematic representation of a first embodiment of an assembly (1) of a package (2) and a suction device (4) for evacuating the package (2). FIG. 1a-1c show a package (2) containing a product and a fluid, such as air which needs be evacuated. The package (2) is at least partially made of packaging film (6). The film (6) is for example flexible and/or elastic. A substantially rigid element (8) abuts against an inner side of the film (6). In this example, the substantially rigid element (8) is designed as a plate, for example a disc, ellipse, polygon with or without rounded corners, or any customized shape specially adapted to the geometry of the package. In the example, the substantially rigid element (8) is provided with a perforation (10). In FIGS. 1a-1c, the packaging film (6), at the location of the substantially rigid element (8) is provided with an aperture (12). The perforation (10) and the aperture (12), in this example, are offset with respect to each other. This means that the perforation (10) and the aperture (12), viewed in projection on the film (6), do not overlap.

The suction device 4, in FIGS. 1a-1c, abuts against an outer side of package (2), at a location where the substantially rigid element (8) substantially lies against the inner side of the packaging film (6). The suction device (4) is provided with a rigid housing (14) and comprises an open side, wherein the open side abuts against the package fluid-tightly. The open side, in this example, forms a suction opening. In this example, the suction device (4), at the open side, is thereto further provided with a sealing edge (16), made of rubber for example. An inner space (18) of the suction device (4), which in this example is enclosed by the housing (14) and the packaging film (6), is in fluid communication with a, for example pneumatic, valve (20) and a vacuum pump (22). Further, in FIG. 1a-1c, the suction opening of the suction device (4) is in fluid communication with the aperture (12) in the film (6).

The assembly described thus far can be used as follows for carrying out a method for evacuating the package (2).

The suction device (4) is abutted against substantially rigid element (8) with the suction opening, for example by pressing. Hence, the film (6) is at least partially arranged between the suction device (4) and the substantially rigid element (8) (see FIG. 1a). Subsequently, the valve (20) is opened and the vacuum pump (22) switched on. The vacuum pump (22) will decrease the pressure in the inner space (18) of the suction device. As a result, at least part of, the air in the package (2) will be sucked out of the package (2) through the perforation (10), the aperture (12), the inner space (18), the valve (20) and the vacuum pump (22). In the example in FIG. 1b, the film (6) bulges in the direction of the suction device (4), away from the substantially rigid element (8), for example because the pressure in the inner space (18) is lower than the pressure in the package (2) and/or due to the flow of air from the package to the suction device (4). The bulging of the film (6) provides the advantage that a perpendicular cross-section of an area between the substantially rigid element (8) and the film (6), through which air flows during evacuation, is increased, which facilitates the evacuation of the package. When sufficient air has been sucked from the package (2), the pump (22) can be switched off. By opening a vent valve (24), which after opening forms a fluid connection between the inner space (18) and the surroundings, the pressure in the inner space (18) can be brought back to atmospheric pressure. This allows for the suction device (4) to be removed from the package (2) in a simple manner. This will also cause the film (6) at the location of the substantially rigid element (8) to be pressed against the substantially rigid element (8). Since in this example, the perforation (10) in substantially rigid element (8) and the aperture (12) in the film (6) are positioned offset from each other, the pressing of the film (6) against the substantially rigid element (8) will result in the aperture (12)

being pressed against a non-perforated part of the substantially rigid element (8), thereby substantially sealing the package (2) airtightly.

In an advanced embodiment, after evacuation of the package (2), the aperture (12) is further sealed using closing means, for example by means of an adhesive sticker and/or grease. The aperture can also be sealed by joining the packaging film (6) fluid-tight to the substantially rigid element (8), for example by sealing, welding or gluing, for example along an endless connection seam, wherein the connection seam circumscribes the aperture (12), and wherein the perforation (10) falls outside of the connection seam. Hence, the fluid connection between the aperture (12) and the perforation (10) is sealed hermetically.

FIGS. 1a-1c show sealing means (26). In this example, the sealing means (26) are designed as a seal ring (28) for welding the film (6) to the substantially rigid element (8). In this example, the seal ring (28) is connected to a movement device. The movement device, in this example, comprises a pneumatic cylinder (32) and a rod (30) of the pneumatic cylinder (32). The cylinder (32) can, in a manner known per se, be controlled by operating valves (34) and/or (36). After the package (2) has been evacuated, the film (6) is pressed against the substantially rigid element (8) using the cylinder (32) and the seal ring (28), which is then heated (see FIG. 1c). Once the film (6) has been welded around the aperture (12) fluid-tightly, the seal ring (28) can be removed from the film (6) using the cylinder (32).

The suction device (4) is, in the example of FIGS. 1a-1c, further provided with a pressure sensor (38). The pressure sensor (38) can be applied to determine the pressure in the inner space (18). The pressure in the inner space (18) can be a measure for the pressure inside the package. The pressure sensor (38) can thus be applied to determine whether the package has been sufficiently evacuated. The pressure sensor can also be used to determine whether the package is leaky.

In the example, a volume of the inner space (18) is much smaller than a volume of the package (2). This allows a very accurate pressure measurement to be made. Moreover, it is thus achieved that the inner space (18) has no, or barely any, influence on the required pump capacity to evacuate the package at a predetermined speed.

In the example of FIGS. Ia-Ic, the substantially rigid element (8) is further provided with a filter (40). The filter is permeable to the fluid and substantially impermeable to the product inside the package. The filter is located between the product and the aperture (12) of the package, flow-wise. In this example, the filter (40) is located on the side of the substantially rigid element that faces away from the film (6), so that the filter (40) extends between the substantially rigid element, more specifically the perforation (10) of the substantially rigid element, and the space enclosed by the package (2). The filter prevents the product inside the package from leaking from the package and/or clogging the aperture (12) during evacuation. The filter further prevents the product from ending up between the substantially rigid element and the film, where the product could prevent the package from being hermetically sealed, after evacuation. Hence, it is also possible to evacuate a package containing a (very fine) powder, such as, for example, cocoa powder, wherein the powder does not leak from the package and/or clog the aperture and/or prevent the package from being hermetically sealed.

In the example shown, the filter (40) substantially extends across the entire surface of the substantially rigid element. It will be appreciated that the filter can also extend across a part of the surface, for example, only near the perforation (10).

Figure 2:
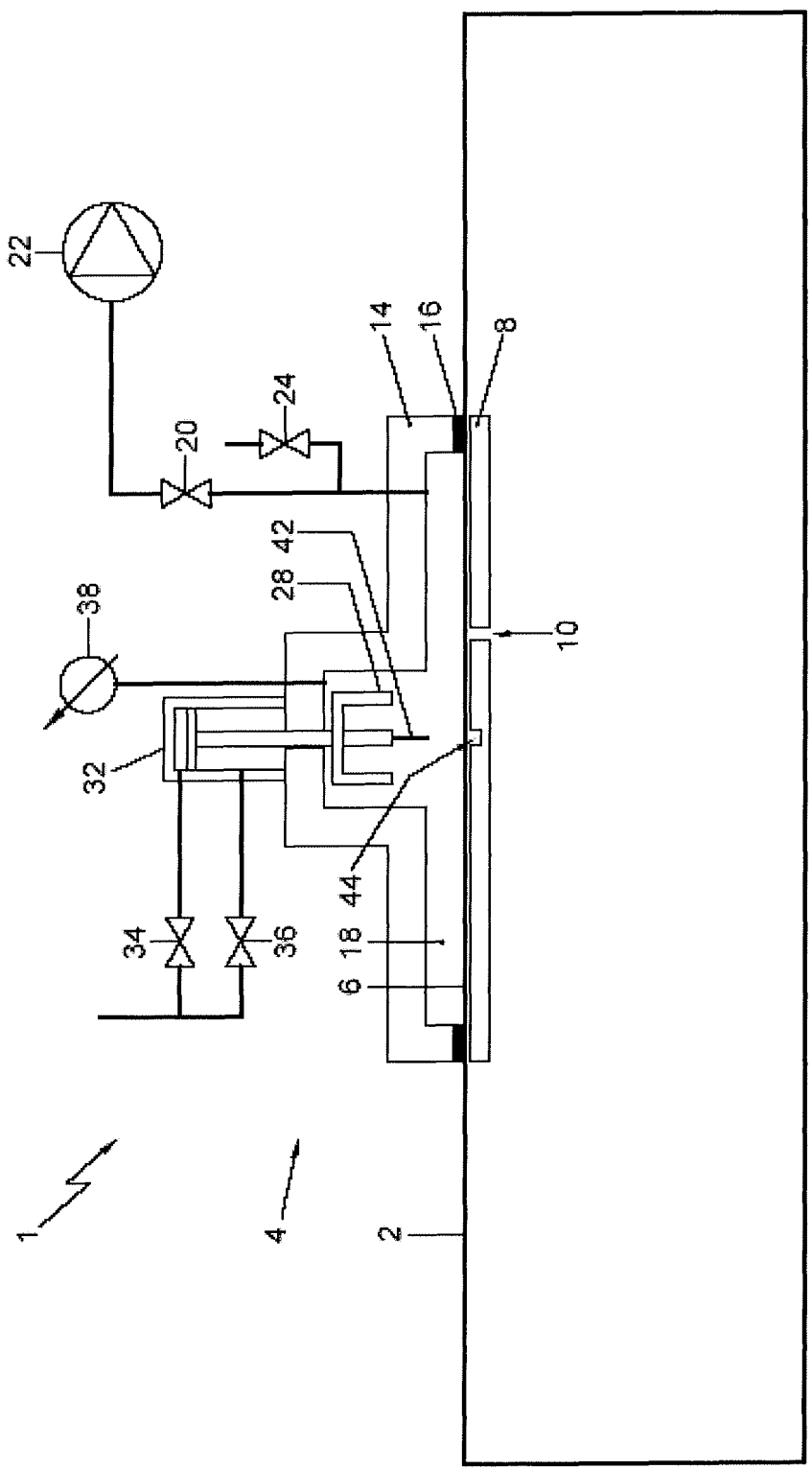
FIG. 2 shows a schematic representation of second embodiment of an assembly of a package and a suction device for evacuation of the package.

FIG. 2 shows a schematic representation of an assembly of a second embodiment of a package (2) and a suction device (4) for the evacuation of package (2).

In the embodiment of FIG. 2, the package (2) is not provided with the aperture (12) before the suction device (4) is being abutted against the package. In this example, the suction device (4) comprises a piercing device. In this example, the piercing device comprises a needle (42). In this example, the needle (42) is connected to a movement device (30), (32) for moving the needle (42).

In FIG. 2, the substantially rigid element (8) is provided with through-going perforation (10) and blind hole (44). The blind hole (44) is located on the side of the substantially rigid element (8) that faces towards the film (6), and is preferably located on a position on a (virtual) line along which the needle (42) can be moved. It will be appreciated that the substantially rigid element shown in FIG. 2 can also be provided with a filter, as described with respect to FIGS. 1a-1c.

The assembly (1) shown in FIG. 2 can be used as follows for carrying out a method for the controlled change of the gas content inside the package.

The package is filled with a product and a substantially rigid element which will be described more in details later is positioned in the inside of the package such that one of the two main surfaces thereof substantially contacts the packaging film. The substantially rigid element may be positioned in contact with the packaging film either before or after the package is filled with the product. In case of a prismatic package is used, like typical packages for coffee or sugar, the substantially rigid element is preferably positioned on the top surface of the package for easier access of the suction device. The suction device (4) is abutted against the substantially rigid element (8), so that the film (6) is at least partially included between the substantially rigid element (8) and the suction opening. Now it can first be checked whether the suction opening abuts fluid-tightly, for example airtightly, against the package (2). To this end the valve (20) is opened and the inner space (18) of the suction device (4) is brought to under pressure by means of the pump (22). The pressure in the inner space (18) is determined using the pressure sensor (38). Then the valve (22) is closed. If the pressure in the inner space (18) remains substantially constant, it may be concluded that the suction device has been fitted fluid-tightly.

For evacuating the package (2), subsequently the needle (42) is pressed through the film (6) using the movement device (30), (32) in order to create the aperture (12). The blind hole (44) in the substantially rigid element (8) facilitates the creation of the aperture. The needle (42) can subsequently be moved again so that the needle does not remain in the film (6).

After forming the aperture (12) using the needle (42), the package can be evacuated as described with respect to FIGS. 1a-1c.

It will be appreciated that the needle (42) in the example of FIG. 2 can also be a hollow needle that is in fluid communication with the inner space (18). Hence, as Soon as the needle (42) pierces the film (6), fluid can flow from the package to the measuring chamber or vice versa. It is also possible that the substantially rigid element (8) is made of a material that can be pierced by the needle (42), such as, for example, a substantially rigid rubber. In a special embodiment, the hollow needle and/or the substantially rigid element (8) are dimensioned such that the hollow needle fully pierces the substantially rigid element (8), so that the hollow needle forms a fluid connection between the space enclosed by the package (2) and the inner space (18) of the suction device. Thus, it is not necessary that the substantially rigid element (8) be provided with the perforation (10) beforehand. Herein is possible that the material of the substantially rigid element (8) is chosen such that the perforation created by the needle (42) closes after removing the needle from the substantially rigid element. Hence, after removing the needle (42), the package (2) is closed substantially fluid-tightly.

"Substantially rigid" when referring to element (8) in the present context means that the element should have structural properties sufficient to ensure a smooth enough contact surface on the packaging film (6) to form a gas tight contact with the opening of the suction device (4). The substantially rigid element (8) can, for instance, comprise a plastic plate. The plate thickness depends on the stiffness required to ensure a smooth surface, which varies depending on the type of product contained in the package, e.g., ground coffee and nuts do not require the same stiffness. Typically, the thickness of the substantially rigid element may be comprised between 0.5 and 5 mm, preferably 1 and 4 mm, most preferably 1 to 3 mm. The substantially rigid element (8) is substantially designed as a plate-shaped body, which perimeter forms a disc, ellipse, polygon with or without rounded corners, or any customized shape specially adapted to the geometry of the package (2). Preferably, the substantially rigid element is round disk. Preferably a surface of the substantially rigid element is such that it can seal the suction opening.

At the location where it contacts the inner side of the packaging film, the substantially rigid element preferably forms a first contact surface, which in the examples extends in a flat plane, against which the inner side of the packaging film abuts, in such a way that the outer side of the packaging film forms, at the location of the first abutment surface, a second contact surface for sealingly abutting the suction opening thereon.

The suction opening can, for example, be round. The size of the suction opening depends on the size of the package to be evacuated, and can, for example, be approximately between 20 and 100 mm, preferably 25 and 50 mm. Preferably, the size of the suction opening is sufficient to ensure that upon actuation of the vacuum pump the chamber holds in sealed contact with the surface of the packaging film without requiring the use of any clamping means. For example, if the area of the suction opening is 25 cm$^2$, a pressure difference of 20 mbar (=20 g/cm$^3$) between the atmosphere and the inside of the suction chamber will yield a clamping force of 500 g, which in many cases is sufficient to self-support the suction device, without having to recur to any external clamping means. Most preferably, the suction opening matches the geometry of the substantially rigid element, the latter being preferably provided with a relatively shallow groove around its perimeter to accommodate the suction opening.

The substantially rigid element (8) can be provided with a surface structure on the side abutting against the packaging film (6). The substantially rigid element (8) can, for example, be corrugated. Thus, prior to evacuation of the package, the packaging film will substantially abut against the peaks of the corrugations, so that between the peaks of the corrugations a free space is created between the—substantially rigid element and the film through which the fluid can flow from the package to the suction device during evacuation.

It is also possible that the substantially rigid element is provided with a surface structure on the side facing away from the package. This will substantially prevent the product from sliding along the substantially rigid element. This also provides the advantage that it reduces the risk of the product in the package clogging the perforation in the substantially rigid element.

In the examples, the substantially rigid element abuts against the package substantially over its entire surface. It is also possible that the substantially rigid element is provided with a lowered area, so that also between the film and, at least part of, the substantially rigid element a free space is created through which the fluid can flow from the package to the suction device during evacuation.

In the examples of FIGS. 1a, 1b, 1c and 2, substantially rigid element (8) is provided with one perforation (10). The substantially rigid element can, however, be also be provided with a plurality of perforations. The substantially rigid element can also be designed, for examples, as a grid. The substantially rigid element can also be provided with at least one groove in the side of the substantially rigid element that abuts against the package, for allowing the fluid in the package to flow through the groove to the space between the film and the substantially rigid element. It is also possible that the substantially rigid element contains no perforation, for example if the substantially rigid element contains a groove that extends on the side abutting against the packaging film, wherein the groove is in fluid communication with at least one location on the substantially rigid element that is free from contact with the packaging film, such as, for example, a side face of the disc.

Figure 3A:
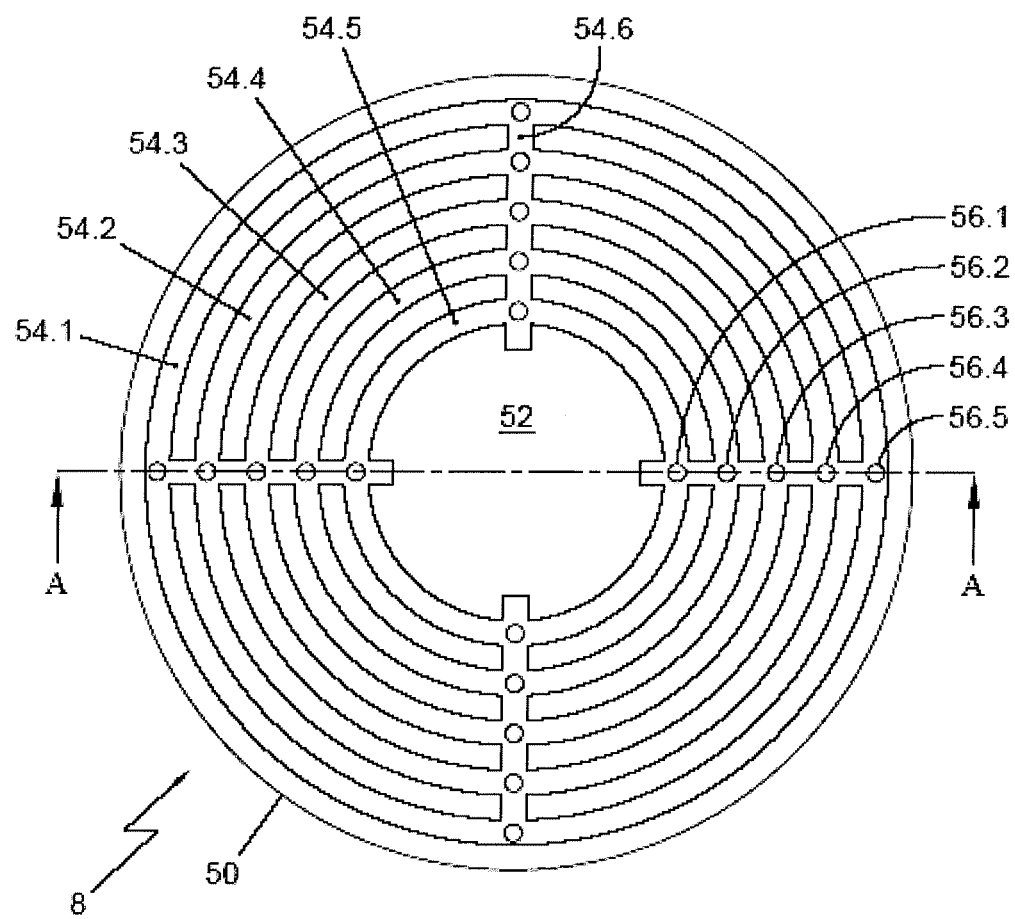
FIG. 3a shows a schematic representation of a bottom view of an embodiment of a substantially rigid element of the assembly according to the invention.
Figure 3B:
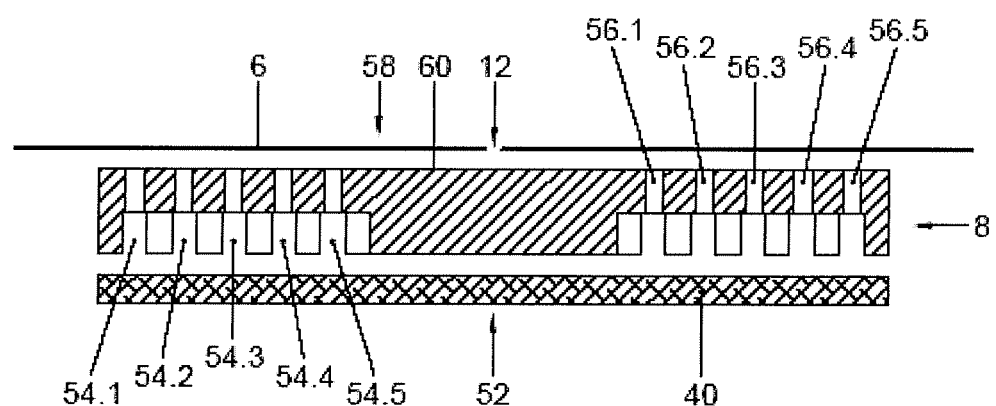
FIG. 3b shows a schematic representation of a cross-section along line A-A of the substantially rigid element of FIG. 3a, and FIG. 4 shows an embodiment for injecting an (inert or functional) gas into a package before or after it was at least partially evacuated.

FIGS. 3a and 3b show a schematic representation of an embodiment of a substantially rigid element according to the invention. In this embodiment, the substantially rigid element (8) is designed as a disc 50 extending in a flat plane. On the side pointing away from the film, the disc 50 is provided with a plurality of grooves 54.$i$ ($i$=1, 2, 3 . . . ). In this example, the grooves 54.$i$ thus extend in the side of the disc 50 that is located opposite side 58 which points towards the film. In this example, the disc 50 comprises both grooves (54.1)-(54.5) which extend in a tangential direction, and grooves 54.6 which extend in a radial direction. In this example, the disc 50 further comprises perforations (56.$j$) ($j$=1, 2, 3, . . . ). In use, the perforations (56.$j$) form fluid connections between the grooves and the aperture (12). In this example, the disc 50, on the side (58) pointing towards the film, is substantially flat and smooth, wherein the perforations (56.$j$) end in the plane pointing towards the film. The plurality of perforations which is in fluid communication with the plurality of grooves provides the advantage that a relatively low flow resistance for the fluid is achieved, while at the same time providing sufficient support for the film to allow for the sealing abutment of the suction opening against the film, and that sufficient rigidity of the substantially rigid element is provided to prevent deformation due to the under pressure in the package and/or structure (such as graininess) of the product inside the package.

The grooves substantially prevent the fluid connection between the aperture (12) and the space enclosed by the package from being closed by the product. If the package contains a coarse-grained product, for example nuts, the coarse grains will abut against the upright walls between the grooves, but are unable to completely close off the grooves, so that the fluid connection remains open.

FIG. 3b also shows the film (6) for illustration purposes. The film (6) is, however, not part of the substantially rigid element. Further, for the sake of clarity, the film is shown at some distance from the substantially rigid element. In use, the film (6) will preferably abut against the side (58) of the substantially rigid element that faces towards the film.

In the example of FIG. 3b, disc (50) at the location of the aperture (12) in the film (6) is provided with a flat part (60), against which the film can be hermetically sealed, as described with respect to FIG. 1c. In this example, the disc (50) is substantially flat and smooth on the side (58) pointing towards the film, wherein the perforations (56.j) end in the plane pointing towards the film, in this example outside of the flat part (60).

If so desired, the disc (50) shown in FIGS. 3a and 3b can be provided with the filter (40). For the sake of clarity, the filter (40) in FIG. 3b is shown at some distance from the disc (50). In practice, the filter (40) can abut against the disc (50). The filter (40) then covers, for example, the grooves (54.i).

The invention is by no means limited to the above-described examples. It is, for example, possible to perform the evacuation of the package in a plurality of steps, for example, if evacuation takes place in an automated line where the cycle time available for evacuation is shorter than the time needed for adequate evacuation of the package. Thus, in a first step of the method, the package can be partially evacuated through the aperture using a first suction device. After removing the first suction device, the aperture may be substantially closed airtightly, for example, as a result of the film around the aperture being pressed against the substantially rigid element due to the difference in pressure inside and outside the package. Subsequently, in a second step of the method, the package can be further evacuated via the aperture using a second suction device.

Furthermore, the substantially rigid element (8) can abut against the inner side of the package (2), for example, free from any mechanical connections. The substantially rigid element (8) can, however, also be joined to the package (2), for example by gluing or sealing.

In a special embodiment, the substantially rigid element (8) is provided with text, for example if the film (6) is substantially transparent.

It is also possible that the substantially rigid element (8) is provided with marks, wherein the suction device, for example an at least partially transparent suction device, can be placed on the substantially rigid element in the correct position, for example centred. It is also possible to provide marks that can be read by a measuring robot in an automated system. When using non-transparent film, a mark can be provided on the outer side of the package to locate a position of the substantially rigid element.

It is also possible that the substantially rigid element is manufactured of a material that has a material property that is identifiable, such as a specific additive that is added to a plastic, so as to allow the origin of the substantially rigid element to be identified. The substantially rigid element can also be provided with a device, such as an RFID transponder, to allow the origin of the substantially rigid element to be identified.

Figure 4:
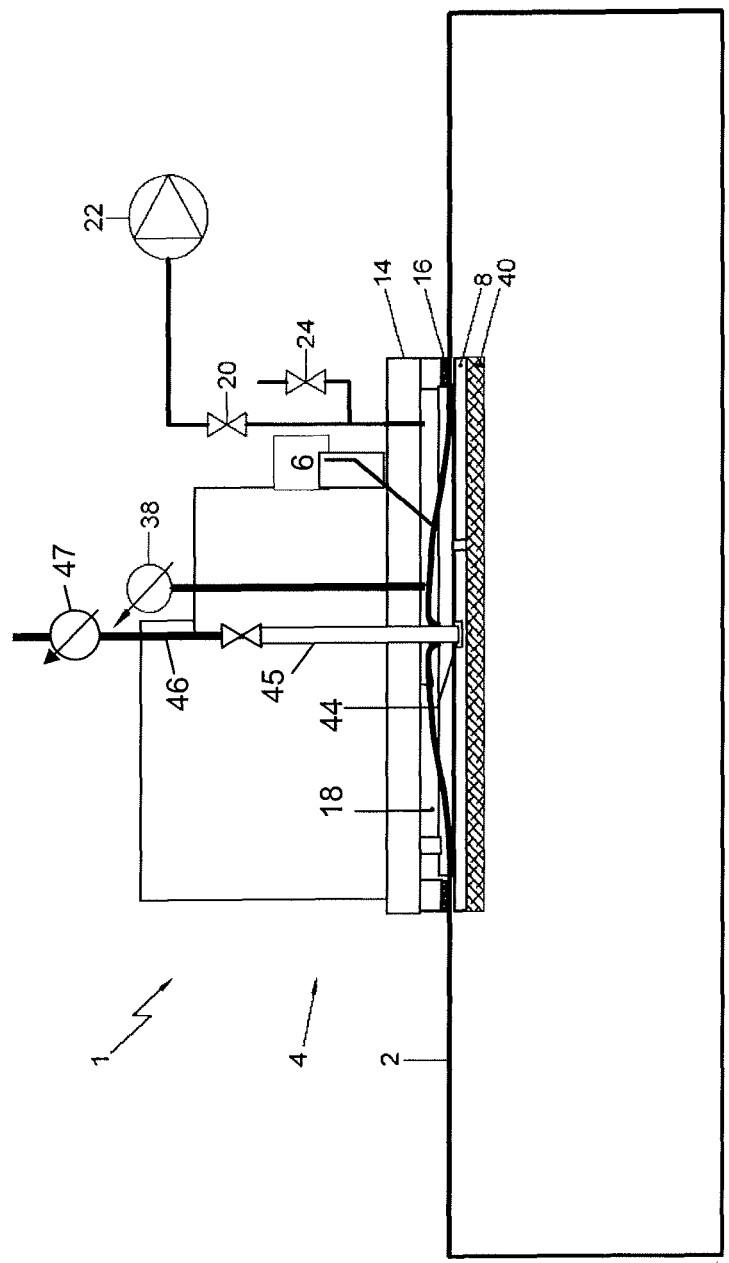

FIG. 4 shows a particularly preferred embodiment which allows the package to be filled with an (inert or functional) gas after it has been at least partially evacuated. In this embodiment; the rigid element (8) preferably comprises a stump, or blind hole (44) to accommodate a duct (45) connected to a source of gas (46) and flowmeter (47) and slidingly mounted on the chamber's deck such that it can be pushed down through a hole (12) in the packaging film (6) to fit into a stump (44) on the rigid element's first surface when inert gas like $CO_2$, $N_2$, Ar, etc. is to be injected into the package, and it can be retrieved from the hole (12) in the packaging film (6) when the package is to be evacuated. When the package is to be evacuated, the duct (45) is pulled up and the system functions as described above. When an (inert or functional) gas is to be injected into the package, the duct (45) is pushed down until it reaches the stump (44) on the rigid element's first surface. It is important that the connection between duct (45) and stump (44) is not gas tight to allow the (inert or functional) gas injected through duct (45) to penetrate into the package.

This method is particularly advantageous because it is easier to hold a slight vacuum of e.g., 800 mbar in a package filled with an (inert or functional) gas than to hold a great vacuum of e.g., 100 mbar, when in many cases, all is required is to reduce the amount of oxygen and reactive species in the package. The method is more efficient if relatively short cycles of evacuation followed by sweeping an (inert or functional) gas are repeated several times until the level of oxygen in the package is reduced to, for example, less than 0.1%.

The present invention can be applied to a broad selection of products varying in size and texture. In particular, it can be applied to any product being solid, powdery, pasty or liquid, which packing under vacuum permits the conservation, volume reduction, integrity (e.g., against counterfeit), protection against moisture, insects, oxidation, contamination, stain, pollution, etc. of said product. For example, the product may belong to any of the groups of foodstuff, consumer's goods, pharmaceutical, cosmetics, healthcare, hygiene, and industrial products.

Non limitative examples of foodstuff comprise drinks, powders of reconstitution for drinks, egg based, meat, fruit, vegetable, spices, food additives like dyes, binders, coagulants flour; yeast, infants' food, dietetic and organic products, cooked preparations; seafood, dairy products, frozen products, animal food, etc. Examples of consumer's goods include textile; cloths, linen, house and office equipment, documents, paper, banknotes, artwork, electronic components, and the like.

Pharmaceutical, cosmetics, healthcare, and hygiene products include inter alia medicines and treating products in the form of pastes, creams, pills, tablets, powders, liquids, syrups.

Finally, industrial products comprise for example cleaning products, parts for any type of equipment in the field of transportation, electricity, electronics, manufacturing, chemistry; heavy industry, agriculture, like seeds and fertilizers, packaging, like corks for wine bottles, etc. It can also be used to apply vacuum to a package containing packed goods for saving space and hence transportation and storage costs.

The applications are infinite and they can be implemented at a small, laboratory scale to large industrial sizes, passing through all the intermediate scales from domestic and office applications to small and medium companies needs. All it requires is to adapt the size and power of the pump to the size of the package. The claimed method is simple to carry out and can be applied to large series as well as to occasional uses.

The invention claimed is:

1. A package for holding a vacuum and to be filled with a particulate material, the package at least partially made of a packaging film, the packaging film surrounding the particulate material, the package including a rigid plate comprising first and second main surfaces separated by a thickness of the rigid plate and further including at least one opening fluidly connecting the first main surface to the second main surface, the rigid plate is placed against an inner surface of the packaging film; such that the first main surface of the rigid plate is provided with a flat portion and contacts the inner surface of the of the packaging film, the packaging film including an aperture at a location enclosed within the perimeter of the rigid plate, the first main surface of the rigid plate having a flat part at the location of the aperture, the aperture offset with respect to all the at least one opening, wherein the second main surface of the rigid plate, on the opposite side of the first main surface, is provided with at least one of (a) a groove in fluid communication with at least one opening and (b) a filter permeable to a fluid and substantially impervious to the particulate material, such that the rigid plate is permeable to the fluid to be evacuated and substantially impermeable to the product contained in the package and is resistant to clogging by the particulate material.

2. The package according to claim 1 wherein the rigid plate is permeable to a fluid, and substantially impervious to particulate materials.

3. The package according to claim 1 wherein the rigid plate is a substantially plate-shaped body, the perimeter of which forms any customized shape specially adapted to the geometry of the package.

4. The package according to claim 1 wherein the rigid plate is substantially plate-shaped body, which includes a perimeter which forms a customized shape specially adapted to the geometry of the package.

5. The package according to claim 1 wherein the rigid plate substantially adheres to the inner surface of the packaging film.

6. A packaging assembly suitable for evacuating the interior of a package and injecting inert gas into the package comprising:
   (a) a packaging film, the film surrounding the particulate material,
   (b) a rigid plate having a thickness with first and second main surfaces separated by the plate's thickness and comprising at least one opening fluidly connecting the first main surface to the second main surface wherein the first main surface of the rigid plate is provided with a flat part in contact with an inner surface of the packaging film, the second main surface positioned opposite to the first main surface of the rigid plate, and including at least one of a groove in fluid communication with at least one opening, and a filter laminated thereon permeable to a fluid and substantially impervious to particulate materials, and
   (c) a suction device connected to a vacuum pump, and comprising a suction opening having a perimeter which fits into the perimeter of the rigid plate, wherein the perimeter of the suction device rests on a film laid on the first main surface of the rigid plate defining a gas tight inner space, the suction device having a piercing device for creating an aperture in the film, the aperture positioned within the perimeter of the flat part in the first main surface of the rigid plate and offset with respect to the at least one opening.

7. The packaging assembly according to claim 6 wherein the suction device is provided with sealing means suitable for sealing an aperture in the packaging film.

8. The packaging assembly according to claim 6 wherein the suction device further comprises a duct connected to a source of inert gas movable through a hole in the packaging film and into a stump on the rigid plate's first surface when inert gas is to be injected into the package, and it can be retrieved from the hole in the packaging film when the package is to be evacuated.

9. The packaging assembly according to claim 7 wherein the suction device further comprises a duct connected to a source of inert gas movable through a hole in the film and into a stump on the rigid plate's first surface when inert gas is to be injected into the package, and it can be retrieved from the hole in the packaging film when the package is to be evacuated.

10. The packaging assembly according to claim 6 wherein the suction device further comprises a duct connected to a source of inert gas movable through a hole in the film and into a blind hole on the rigid plate's first surface when inert gas is to be injected into the package, and it can be retrieved from the hole in the packaging film when the package is to be evacuated.

11. The packaging assembly according to claim 7 wherein the suction device further comprises a duct connected to a source of inert gas movable through a hole in the packaging film and into a blind hole on the rigid plate's first surface when inert gas is to be injected into the package, and it can be retrieved from the hole in the packaging film when the package is to be evacuated.

* * * * *